(12) United States Patent
Sankaranarayanan et al.

(10) Patent No.: US 8,677,433 B2
(45) Date of Patent: Mar. 18, 2014

(54) ENDURANCE TESTING OF A CONTENT PROCESSING DEVICE

(75) Inventors: Parvathinathan Sankaranarayanan, Irving, TX (US); Deepak Muthumohan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 876 days.

(21) Appl. No.: 11/956,149

(22) Filed: Dec. 13, 2007

(65) Prior Publication Data

US 2009/0158381 A1 Jun. 18, 2009

(51) Int. Cl.
*H04N 7/173* (2011.01)
(52) U.S. Cl.
USPC ............................ 725/107; 725/116; 725/131
(58) Field of Classification Search
USPC ............. 725/31, 54, 105, 107, 109, 110, 116, 725/131, 133; 348/180, 192; 714/755
See application file for complete search history.

(56) References Cited

U.S. PATENT DOCUMENTS

| | | | | |
|---|---|---|---|---|
| 6,002,871 A * | 12/1999 | Duggan et al. | ................ | 717/135 |
| 7,380,265 B2 * | 5/2008 | Jensen et al. | .................. | 725/107 |
| 7,607,148 B2 * | 10/2009 | Feinberg et al. | ................ | 725/22 |
| 7,895,632 B2 * | 2/2011 | Sadja et al. | .................... | 725/107 |
| 2005/0022228 A1 * | 1/2005 | Davis | .............................. | 725/28 |
| 2005/0193036 A1 * | 9/2005 | Phillips et al. | ................ | 707/202 |
| 2009/0089854 A1 * | 4/2009 | Le et al. | ........................ | 725/139 |

* cited by examiner

*Primary Examiner* — John Schnurr

(57) ABSTRACT

A content processing device is configured to selectively receive a media signal from a media signal provider. A distribution device is configured to selectively receive a media signal from the content processing device, and to selectively provide one or more command signals to the content processing device. A computer is configured to selectively receive the media signal from the distribution device, and to selectively provide commands to the distribution device. The distribution device is further configured to provide the received one or more commands to the content processing device via the one or more command signals.

18 Claims, 3 Drawing Sheets

ENDURANCE TESTING OF A CONTENT PROCESSING DEVICE

BACKGROUND INFORMATION

Set-top boxes (STBs), like many consumer media devices, provide a video output and are controlled through a remote control. STBs are typically subjected to various types of testing to determine the device's safety and reliability. For example, an endurance, or stress, test can help gauge the reliability of an STB.

An endurance test may be conducted by a manufacturer, distributor, provider, regulatory agency, consumer group, electronics association, or some other entity. The purpose of an endurance test is to understand how a device will respond to use over a period of time. For example, one type of endurance test includes continuously sending commands from the remote control to the STB. This type of test is presently carried out by a person who operates a remote control and observes output from an STB on a television. Some tests can last for days. In general, such testing is very labor intensive and expensive.

Various tools may be used to perform an endurance test. Generally, to conduct an endurance test, a tool sends a series of commands to an STB, and attempts to monitor the device for failures. Unfortunately, such tools often fail to detect important events, such as system crashes, and may further fail to log the sequence of commands or events that caused the crash.

DETAILED DESCRIPTION OF PREFERRED EMBODIMENTS

Figure 1:
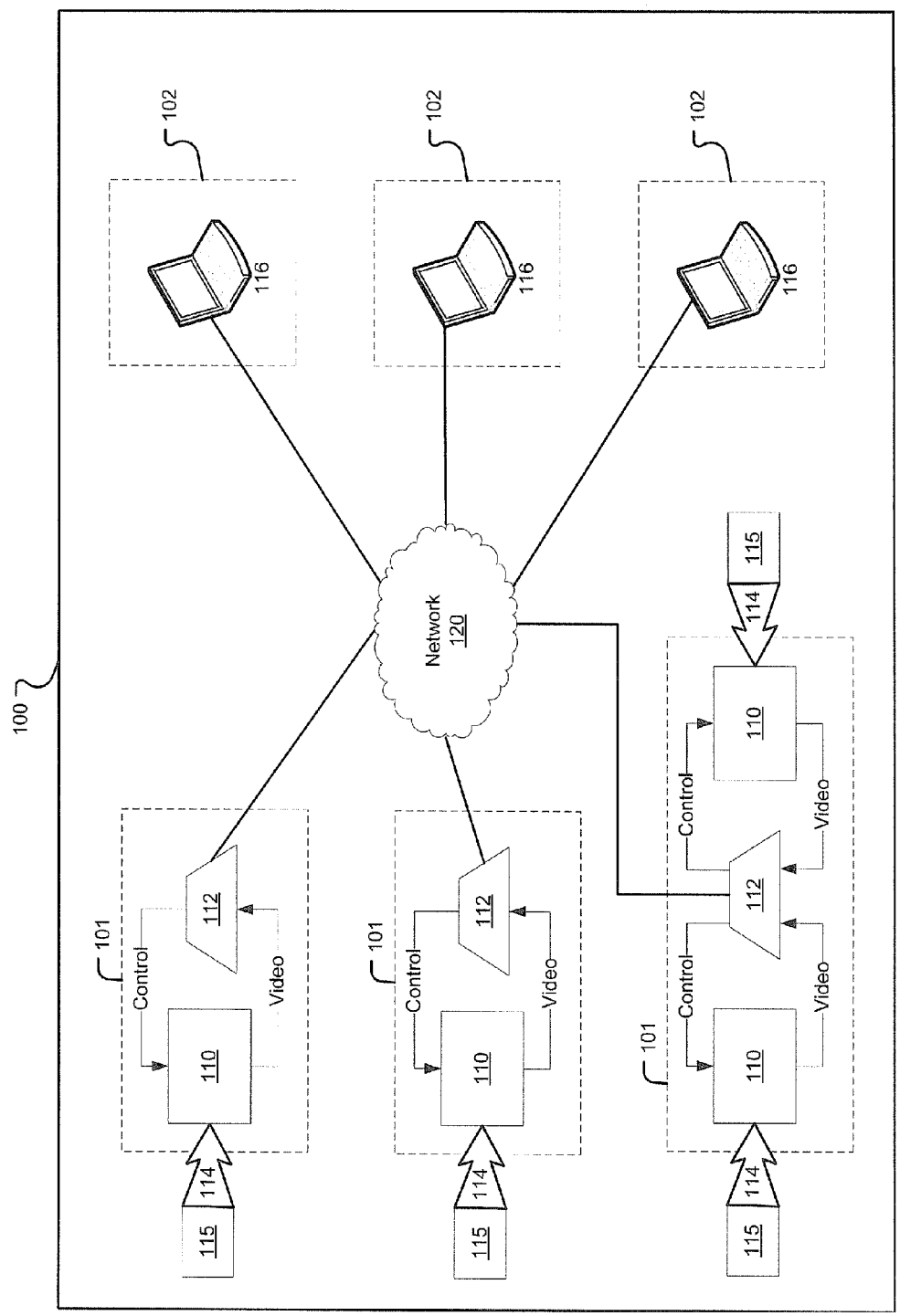
FIG. 1 illustrates an exemplary system for endurance testing a content processing device.

FIG. 1 illustrates an exemplary system 100 for endurance testing a content processing device 110, such as a set-top box (STB). System 100 generally includes one or more test cells 101, one or more control stations 102, and a network 120. A test cell 101 includes a content processing device 110 that may be subjected to an endurance test, and a distribution device 112. Control station 102 generally includes a computer 116 configured to perform an endurance test. As will be discussed in greater detail below, system 100 provides automated endurance testing without requiring expensive tools or a person to monitor a test.

Content processing device 110 is generally a consumer electronic device that provides a video output and is operable by a user via a remote control. Content processing device 110 is generally a set-top box (STB) or the like. However, content processing device 110 may be any one of a number of content processing devices, including a video cassette recorder (VCR), a digital video disc (DVD) player, a digital video recorder (DVR), a personal video recorder (PVR), a video game console, a cellular phone, a hand-held video player, a television (TV), etc. An STB, for example, is a content processing device that receives an external media signal 114, and provides a video output to a television.

External media signal 114 is generally provided by a media signal provider 115. Media signal provider 115 may be a media or content provider, such as a cable or satellite television provider. Media signal provider 115 may also be another content processing device, such as a VCR, PVR, DVD player, or the like.

Distribution device 112 is generally a device that facilitates data transfer between content processing device 110 and computer 116 over network 120. Thus, distribution device 112 may be a network device that is capable of receiving a media signal, e.g., streaming video and/or audio, from content processing device 110, and streaming that media signal over network 120, e.g., to a remote device such as a computer 116. Distribution device 112 also allows for a remote device, such as computer 116, to remotely control content processing device 110. Generally, distribution device 112 receives remote control commands from computer 116, and submits those commands to content processing device 110. Further, distribution device 112 receives a media signal from content processing device 110, and enables computer 116 to receive that media signal. For example, distribution device 112 may be a SlingBox from Sling Media of San Mateo, Calif.

Generally, distribution device 112 includes a remote control output and one or more inputs to receive an audio, video, and/or media signal. The remote control output allows distribution device 112 to submit commands to content processing device 110. The remote control output can be a direct cable connection, such as a serial cable or a universal serial bus (USB) cable. Alternatively or additionally, the remote control output can utilize a wireless mechanism, such as an infrared emitter, a radio frequency control, a universal remote control, or some other remote control mechanism. Distribution device 112 also includes one or more inputs of various types, including: coaxial, composite video, component video, separate video (S-video), high-definition multimedia interface (HDMI), digital visual interface (DVI), video graphics array (VGA), and DisplayPort. The number and type of inputs, as well as the type of remote control output, may depend on the type of content processing device 110 being tested.

Generally, distribution device 112 provides a remote command signal to, and receives a media signal from, content processing device 110. For example, content processing device 110 may be an STB that may be controlled through the use of infrared signals. Accordingly, the command signal may be an infrared remote control signal. Distribution device 112 may include an infrared emitter that is positioned such that an infrared signal provided by the emitter will be received by content processing device 110, thereby allowing distribution device 112 to provide remote control commands to content processing device 110. Further, distribution device 112 may receive a media signal from content processing device 110 by connecting a video cable from a video output port of content processing device 110 to a video input port on distribution device 112. It is to be understood that content processing device 110 and distribution device 112 may communicate using a wide variety of mechanisms, hardware, and/or protocols, including various wired and wireless networking technologies, such as universal serial bus (USB), internet protocol, 802.11, Bluetooth, etc.

Control station 102 generally includes a computer 116 that is configured to perform an endurance test. Computer 116 sends remote control commands to, and receives a media signal from, content processing device 110, generally through network 120 and distribution device 112. Computer 116 is typically a personal computer (PC) that includes a memory, a processor (CPU), a computer-readable medium, a network connection, a display, and one or more input devices, such as a keyboard and a mouse. Computer 116 typically utilizes an operating system, such as Microsoft Windows, Linux, UNIX, or Mac OS. Computer 116 may be a handheld computer, a personal digital assistant (PDA), a tablet computer, a server, a cellular phone, or some other computing device, potentially utilizing any number of different operating systems or software applications.

Computer 116 can also include one or more computer-readable media that includes various sets of computer-readable instructions. For example, computer 116 may include instructions to remotely control content processing device 110; to view a media signal from content processing device 110; to monitor the status of content processing device 110; to send a series of commands to content processing device 110; and to manage multiple tests and multiple test results. For example, computer 116 may include a client application that includes a set of instructions for remotely controlling content processing device 110 through distribution device 112. A client application may also include instructions for receiving a media signal from content processing device 110 through distribution device 112. SlingPlayer from Sling Media is but one example of a client application that includes instructions for carrying out one or more of the aforementioned operations.

Computer 116 may also include one or more applications having instructions stored on a computer-readable medium to perform various operations. For example, computer 116 may include instructions to submit a series of remote control commands to content processing device 110, as well as instructions to monitor the received media signal from content processing device 110. Further, computer 116 may include instructions to log various events, and/or instructions to perform an action or create an alert in response to an event. For some or all of the operations described above, computer 116 may utilize a test tool, such as WinRunner or QuickTest Professional, both from Mercury Corporation of Sunnyvale, Calif. In general, such applications include instructions executed by computer 116 that may carry out various operations, and may interpret and carry out operations according to a test script or the like. Such instructions may also recognize and respond to a trigger event, possibly according to a test script or the like. Generally, scripting applications, like WinRunner, include computer-readable instructions that can recognize a particular output or trigger event, such as when content processing device 110 experiences a failure. For example, various testing/scripting applications, such as WinRunner, include instructions for analyzing a graphical or video output to computer 116. Generally, when content processing device 110 experiences a failure, computer 116 displays a "No Signal" graphical banner to indicate that content processing device 110 is no longer providing a media signal. A testing or scripting application may include instructions for reading such a graphical banner, and thereby detecting a failure or trigger event. Such applications may also include instructions for responding to a trigger event, and perform additional tasks in response to the trigger event, as will be discussed in greater detail below.

Further, computer 116 may utilize a testing management application, such as TestDirector, also from Mercury Corporation. A testing management application generally includes computer-readable instructions for storing results of one or more tests, and may also include instructions for storing one or more test scripts. Testing management applications may also enable a control station 102 to manage multiple test cells 101, thereby performing endurance tests on multiple content processing devices 110 simultaneously.

Network 120 generally connects test cells 101 to control stations 102. Network 120 is generally packet switched network. Of course, network 120 may also include or be connected to various other networks, including a wide area network (WAN), a wireless network, a cellular network, etc. As shown in FIG. 1, system 100 may include multiple test cells 101 and multiple control stations 102 connected through network 120. As illustrated in FIG. 1, computer 116 and distribution device 112 are generally connected to, and communicate via, network 112. Further, although not explicitly shown in FIG. 1, content processing device may also be connected to network 120, and may also thereby communicate with computer 116.

Figure 2:
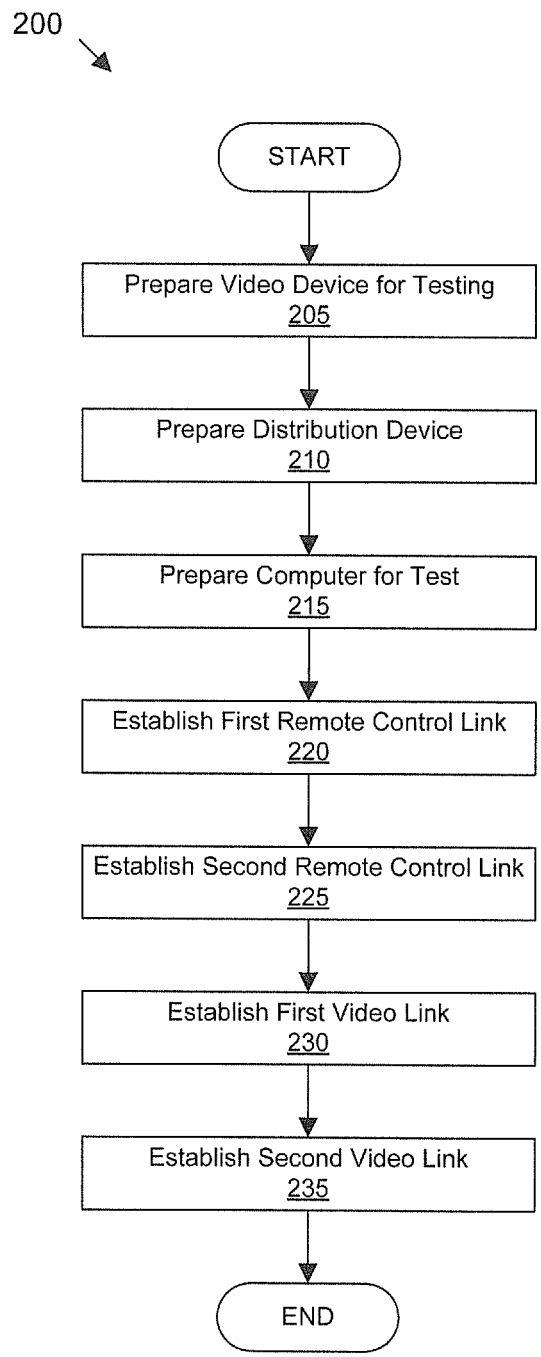
FIG. 2 illustrates an exemplary process for preparing to conduct an endurance test.

FIG. 2 illustrates an exemplary process 200 for preparing to conduct an endurance test. Process 200 begins in step 205, when a content processing device 110 is prepared for testing. Preparing content processing device 110 may include installing or configuring one or more applications to receive commands, e.g., from distribution device 112, and connecting content processing device 110 to an external media or video signal and/or to distribution device 112, etc. For example, an operator may prepare content processing device 110 for testing by powering the device on and configuring the device for use by a user. Further, the content processing device 110 may be connected to external media signal 114, e.g., a video signal, provided by a content provider. In addition, content processing device 110 may be prepared by receiving one or more applications or updates to existing applications or an operating system. For example, content processing device 110 may include instructions as part of one or more applications for receiving inputs, e.g., through an infrared remote control or the like, and then displaying certain information or otherwise affecting the display of media on a display, e.g., a television, associated with the content processing device 110. For example, content processing device 110 generally includes instructions for receiving commands to change video channels.

Next, in step 210, distribution device 112 is prepared for an endurance test. Generally, such preparation may include configuring distribution device 112 to communicate over network 120. For example, distribution device 112 may require a static or dynamic IP address, a network name, a user name, a password, as well as other configuration options. Such additional configuration options may include configuring distribution device 112 for use with a particular content processing device 110. For example, distribution device 112 may need to be configured to receive a particular type of media signal, e.g., a video signal, from content processing device 110.

Next, in step 215, computer 116 is prepared for a test, generally such that computer 116 is able to remotely conduct an endurance test on content processing device 110. Preparing computer 116 may include connecting computer 116 to network 120; configuring computer 116 for use on network 120; installing one or more applications, e.g., test tools; writing a test script; and/or loading a test script. For example, preparing computer 116 may include installing a client application, installing a scripting application, and/or installing a testing management application. In any case, computer 116 generally includes some test tool to facilitate testing of content processing device 110. Preparation typically enables computer 116 to communicate with distribution device 112, generally allowing computer 116 to send remote control commands to, and receive a media signal from, content processing device 110. Further, following preparation, computer 116 may perform one or more operations of process 300 without requiring human intervention, such as by requiring an operator to manually perform a task. For example, as will be discussed below with reference to FIG. 3, computer 116 may be able to utilize a scripting application to interpret commands from a test script to send a series of remote control commands; monitor a received media signal; determine if a trigger event has occurred; and respond to a trigger event by logging the event and potentially sending a specialized remote control command.

Next, in step 220, a first remote control link between distribution device 112 and content processing device 110 is established. For example, an STB may be controlled through the use of infrared signals emitted by a remote control. Distribution device 112 may include an infrared emitter for sending remote control commands. Placing the infrared emitter such that an infrared signal provided by the emitter will be received by content processing device 110 allows distribution device 112 to send remote control commands to content processing device 110. Content processing device 110 may also be controlled by a radio frequency (RF) remote control. Distribution device 112 may include an RF emitter. Establishing a first remote control link may include configuring the RF emitter to communicate with content processing device 110, such as by selecting a particular frequency, for example. Further, distribution device 112 may need to be configured by providing the make and model of content processing device 110 to distribution device 112 to ensure proper communication and command interpretation.

Next, in step 225, a second remote control link between computer 116 and content processing device 110 is established, generally through distribution device 112. For example, computer 116 may send remote control commands or instructions to distribution device 112, which then forwards those commands to content processing device 110. To establish a second remote control link, for example, a client application on computer 116 may need to be configured to send remote control instructions to distribution device 112. Such configuration may include selecting a distribution device 112 on network 120, providing the make and model of content processing device 110 to computer 116, etc. Of course, the second remote control link may be established by accessing a web page or using a software application. For example, computer 116 may utilize a client application, such as SlingPlayer from Sling Media, to remotely control content processing device 110 by sending remote control commands to distribution device 112.

Next, in step 230, a first media link between content processing device 110 and distribution device 112 is established. Such a first media link may be a video link, which generally includes connecting a video cable from a video output port of content processing device 110 to a video input port on distribution device 112. As noted above, content processing device 110 is generally configured to receive media content from an external source, and to provide the media content for display, e.g., on a television set.

Next, in step 235, a media link, e.g., a second video link, between computer 116 and distribution device 112 is established. Establishing a second video link may include accessing a web page or using a streaming video application to access a media signal. For example, a client application installed on computer 116, such as Sling Player from Sling Media, may be used to establish the second video link. Following step 235, process 200 ends.

Figure 3:
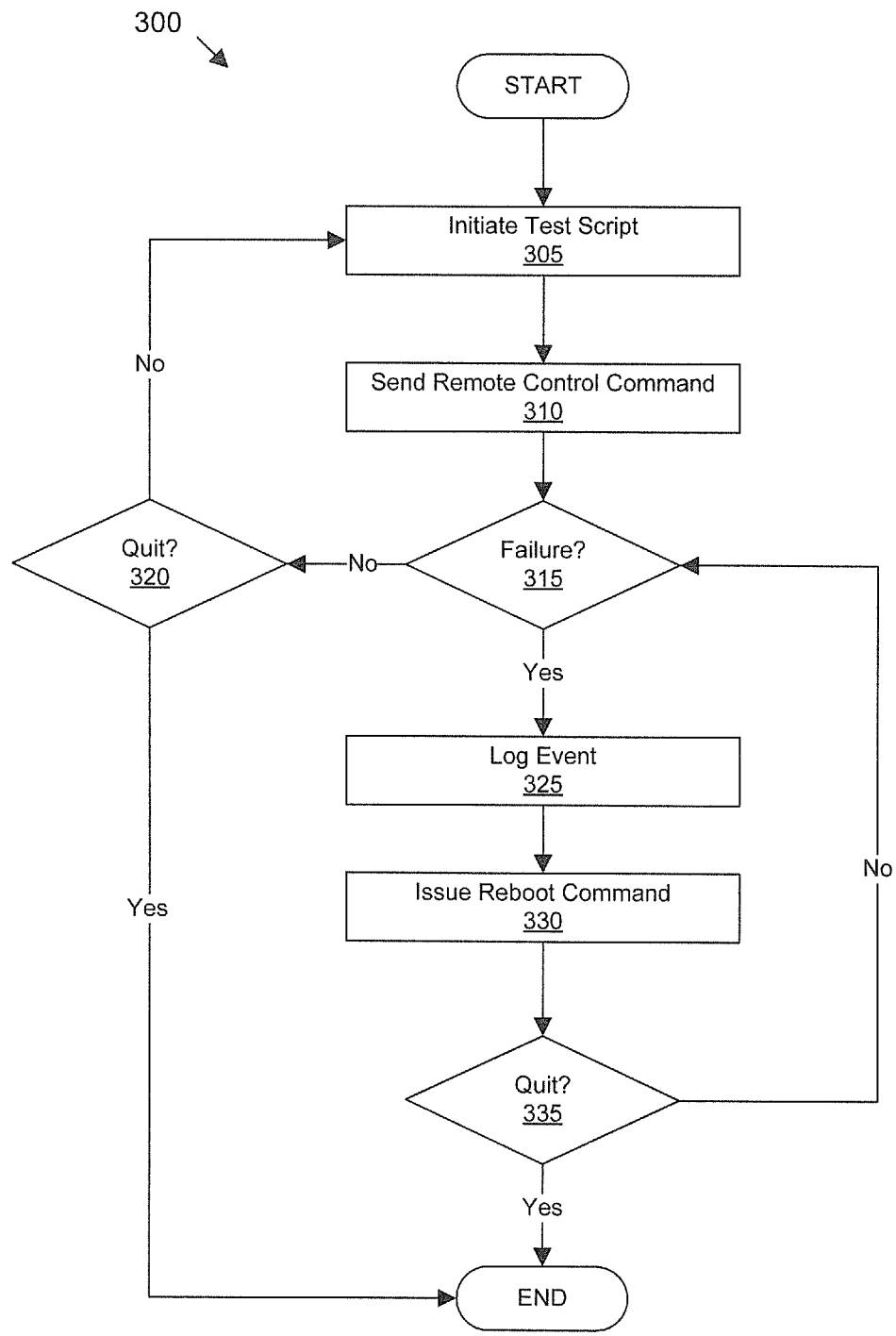
FIG. 3 illustrates an exemplary process for conducting an endurance test.

FIG. 3 illustrates an exemplary process 300 for conducting an endurance test. Process 300 begins in step 305, when a test script is initiated. Computer 116 may utilize a scripting application, such as WinRunner or QuickTest Professional, to interpret and carry out instructions stored in a test script. Generally, utilizing a test script allows computer 116 to perform various operations without human intervention. For example, a test script may include computer-readable instructions for performing one or more steps of process 300.

Next, in step 310, computer 116 sends a remote control command to content processing device 110 through distribution device 112. Generally, the remote control command is one command in a series of remote control commands. However, computer 116 may randomly select a command from a group of commands, where the group generally includes commands affecting a channel change, a DVR function, a video-on-demand (VOD) service, a menu function, a program guide selection, etc. Computer 116 generally selects and sends a remote control command according to a test script, as discussed above. Further, computer 116 may utilize a client application, such as SlingPlayer from Sling Media, to send a remote control command.

Next, in step 315, computer 116 determines if content processing device 110 experienced a failure event. Computer 116 may execute a test script through a scripting application. The test script may include instructions for determining if a failure event has occurred, generally by monitoring the received media signal for a video cue. A failure event may be a system crash, a system reset, or some other undesirable behavior. Generally, a failure event is evidenced by one or more video cues, such as a black screen, a lost signal notification, etc. In one embodiment, a client application on computer 116 receives and displays the media signal from content processing device 110. A scripting application, according to a test script, monitors the received media signal for a video cue indicating that a failure event has occurred. A test script may include instructions for interpreting a failure event as a trigger event, and, upon detection, perform one or more additional operations. If no failure has occurred, process 300 proceeds to step 320. If a failure has occurred, process 300 proceeds to step 325.

In step 320, computer 116 determines if a quit request has been received. Generally, process 300 continues in a loop until receiving a quit request, typically from a human operator. However, a quit request may be sent using a test script. For example, a test script may include instructions to continue the endurance test for a specified period of time. After that period of time has elapsed, a test script may include instructions for sending a quit request. If no quit request has been received, process 300 proceeds to step 305. If a quit request has been received, process 300 ends.

In step 325, which may follow step 315, computer 116 logs the failure event detected in step 315. An event log may include one or more pieces of information, including: a duration of the test; a date; a time; a sequence of previously submitted commands; and the last command submitted to content processing device 110.

Next, in step 330, computer 116 issues a reboot command to content processing device 110. A reboot command could be sent through distribution device 112, but could also be sent from computer 116 to content processing device 110 via network 120 without transmission though device 112. Generally, once content processing device 110 experiences a failure event, it typically requires a system reset or reboot. Rebooting content processing device 110 typically allows an endurance test to continue. A scripting application, using a test script, may include instructions to respond to a trigger event, such as a system failure, by logging the event and issuing a system reset or reboot to content processing device 110.

Next, in step 335, computer 116 determines if a quit request has been received. If no quit request has been received, process 300 proceeds to step 315. If a quit request has been received, process 300 ends.

Following process 300, an operator can review an event log and determine the results of the endurance test. Of course, as shown in FIG. 1, multiple content processing devices 110 can be tested simultaneously. Then an operator may review the event log for each content processing device 110, or may review a centralized log to review the results from multiple tests from multiple devices. Further, test results from an event log may be stored in a centralized database in order to perform additional analysis.

As illustrated in FIG. 1, each test cell 101 is shown having a corresponding control station 102. Although shown as a one-to-one ratio, a control station 102 may control multiple test cells 101, thus providing even more efficient testing of content processing devices 110. Further, each test cell 101 may include multiple content processing devices 110 connected to one distribution device 112. For example, distribution device 112 may include multiple remote control outputs, and multiple inputs, thereby enabling distribution device 112 to communicate with multiple content processing devices 110 simultaneously. Further, distribution device 112 may enable computer 116 to remotely control, as well as to receive one or more media signals from, a plurality of content processing devices 110. In general, system 100 is capable of multiple configurations, including but not limited to those described herein.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A system, comprising:
a plurality of content processing devices, each configured to selectively receive a media signal from a media signal provider, wherein each of the content processing devices comprises customer premises equipment;
a distribution device that is configured to selectively receive a media signal from at least some of the plurality of content processing devices, and to selectively provide one or more command signals to the plurality of content processing devices; and
a computer that is configured to selectively receive the media signal from the distribution device, and to selectively provide test commands to the distribution device,
the distribution device being further configured to provide the received media signals to a computer via a network and to provide the received one or more test commands to at least one of the plurality of content processing devices via the one or more command signals,
the computer being further configured to send the one or more test commands to, and receive the media signal from, the distribution device, and to interpret instructions from a test script, wherein the computer is further configured to monitor the received media signal from the distribution device to determine if at least one of the plurality of content processing devices has experienced a failure event, and send a reboot command to the at least one of the plurality of content processing devices via the network without transmission through the distribution device if a failure event has occurred, the computer being further configured to continue the test of the at least one of the plurality of content processing devices subsequent to a reboot, wherein the test following the reboot continues from the point in the test script where the failure event occurred, and
the computer being further configured to create a log entry if a failure event has occurred, the log entry comprising: a duration of the test, a sequence of previously submitted test commands, and the last command submitted to the at least one of the plurality of content processing devices before the failure event occurred.

2. A system, comprising:
a content processing device that is configured to selectively receive a media signal from a media signal provider, wherein the content processing device comprises customer premises equipment;
a distribution device that is configured to selectively receive a media signal from the content processing device, and to selectively provide one or more command signals to the content processing device;
a computer that is configured to selectively receive the media signal from the distribution device, and to selectively provide test commands to the distribution device, the distribution device being further configured to provide the received one or more test commands to the content processing device via the one or more command signals, wherein the computer is further configured to interpret instructions from a test script, wherein the computer is further configured to monitor the received media signal from the distribution device to determine if the content processing device has experienced a failure event, and send a reboot command to the content processing device via the network without transmission through the distribution device if a failure event has occurred, the computer being further configured to continue the test of the content processing device subsequent to a reboot, wherein the test following the reboot continues from the point in the test script where the failure event occurred, and the computer being further configured to create a log entry if a failure event has occurred, the log entry comprising: a duration of the test, a sequence of previously submitted test commands, and the last command submitted to the content processing device before the failure event occurred.

3. The system of claim 2, wherein the content processing device is one of a set-top box, a video cassette recorder, a digital video disc player, a digital video recorder, a personal video recorder, a video game console, a cellular phone, a hand-held video player, and a television.

4. The system of claim 2, wherein the computer is one of a personal computer, a workstation, a handheld computer, a personal digital assistant, a tablet computer, a server, and a cellular phone.

5. The system of claim 2, wherein the command signal is communicated through an infrared signal, a radio frequency signal, or a direct cable connection.

6. The system of claim 2, wherein the distribution device is configured to selectively receive a media signal from a plurality of content processing devices, to selectively provide one or more command signals to the plurality of content processing devices, and is further configured to provide the received media signals to the computer via a network.

7. The system of claim 2, wherein the failure event is one of a system crash, a system reboot, and a lost media signal.

8. The system of claim 2, wherein the computer determines if the failure event has occurred by monitoring the received media signal for a lost or a dropped signal.

9. The system of claim 2, wherein the failure event is detected by a video output providing a lost video indicator.

10. A method, comprising:
providing a media signal from a content processing device to a distribution device, wherein the content processing device comprises customer premises equipment;
receiving the media signal, in a computer, from the distribution device;
interpreting instructions from a test script;
providing a first test command from the computer to the distribution device;
providing a second test command, from the distribution device, based on the first command, to the content processing device;
monitoring the received media signal in the computer to determine if the content processing device has experienced a failure event;
detecting a failure event associated with the content processing device;
sending a reboot command to the content processing device via a network without transmission through the distribution device in response to the failure event;
creating a log entry in response to the failure event, the log entry comprising: a duration of the test, a sequence of previously submitted test commands, and the last command submitted to the content processing device before the failure event occurred; and
continuing the test of the content processing device subsequent to a reboot, wherein the test following the reboot continues at the point in the test script where the failure event occurred.

11. The method of claim 10, wherein the content processing device is one of a set-top box, a video cassette recorder, a digital video disc player, a digital video recorder, a personal video recorder, a video game console, a cellular phone, a hand-held video player, and a television.

12. The method of claim 10, wherein the computer is one of a personal computer, a workstation, a handheld computer, a personal digital assistant, a tablet computer, a server, and a cellular phone.

13. The method of claim 10, wherein the failure event is one of a system crash, a system reboot, and a lost media signal.

14. The method of claim 10, wherein the computer determines if the failure event has occurred by monitoring the received media signal for a lost or a dropped signal.

15. The method of claim 10, wherein the failure event is detected by a video output providing a lost video indicator.

16. A non-transitory computer-readable medium comprising instructions tangibly embodied thereon, the instructions including instructions for:
receiving a media signal from a distribution device that is in communication with a content processing device, wherein the content processing device comprises customer premises equipment;
interpreting instructions from a test script;
providing a test command to the distribution device for the content processing device;
monitoring the received media signal;
determining if the content processing device has experienced a failure event;
sending a reboot command to the content processing device via a network without transmission through the distribution device if a failure event has occurred;
creating a log entry if a failure event has occurred, and providing a test command if no failure event has occurred,
recording in the log entry a duration of the test, a sequence of previously submitted test commands, and the last command submitted to the content processing device before the failure event occurred; and
continuing the test of the content processing device subsequent to a reboot, wherein the test following the reboot continues at the point in the test script where the failure event occurred.

17. The non-transitory computer-readable medium of claim 16, the instructions further including instructions for displaying a video portion of the received media signal.

18. The non-transitory computer-readable medium of claim 16, the instructions further including instructions for receiving a media signal, and providing a test command to a plurality of distribution devices based on the media signal.

* * * * *